United States Patent
Chang et al.

(10) Patent No.: US 8,573,826 B2
(45) Date of Patent: Nov. 5, 2013

(54) SIDE-LIGHT TYPE LIGHT GUIDE PLATE ASSEMBLY AND BACKLIGHT MODULE

(75) Inventors: Kuangyao Chang, Guangdong (CN); Chechang Hu, Guangdong (CN); Jianfa Huang, Guangdong (CN); Jing Zhang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 13/122,456

(22) PCT Filed: Mar. 10, 2011

(86) PCT No.: PCT/CN2011/071703
§ 371 (c)(1),
(2), (4) Date: Apr. 4, 2011

(87) PCT Pub. No.: WO2012/113164
PCT Pub. Date: Aug. 30, 2012

(65) Prior Publication Data
US 2012/0320628 A1    Dec. 20, 2012

(30) Foreign Application Priority Data

Feb. 25, 2011  (CN) .......................... 2011 1 0046740

(51) Int. Cl.
*F21V 7/04*  (2006.01)
(52) U.S. Cl.
USPC ............................ 362/609; 362/624; 362/626
(58) Field of Classification Search
USPC ......... 362/623, 624, 625, 626, 627, 632, 633, 362/634
See application file for complete search history.

(56) References Cited

U.S. PATENT DOCUMENTS

| | | | |
|---|---|---|---|
| 7,325,959 B2 * | 2/2008 | Tsai | 362/627 |
| 7,762,708 B2 * | 7/2010 | Lee et al. | 362/632 |
| 8,210,731 B2 * | 7/2012 | Iwasaki | 362/625 |
| 2002/0097578 A1 * | 7/2002 | Greiner | 362/623 |
| 2004/0246743 A1 | 12/2004 | Lee et al. | |
| 2005/0030443 A1 | 2/2005 | Nagahama et al. | |
| 2007/0085943 A1 | 4/2007 | Kang et al. | |
| 2008/0137364 A1 | 6/2008 | Liu | |

FOREIGN PATENT DOCUMENTS

JP        2006010788 A    1/2006

* cited by examiner

*Primary Examiner* — Y My Quach Lee
(74) *Attorney, Agent, or Firm* — Mark M. Friedman

(57) ABSTRACT

The present invention discloses a side-light type light guide plate assembly and a backlight module, which has a light guide plate and at least one reflector sheet. The light guide plate has a lower surface, a light output surface opposite to the lower surface, and at least one light input side surface connected between the lower surface and the light output surface. The reflector sheet is correspondingly disposed on at least one side surface of the light guide plate except for the light input side surface, while a medium layer is defined between the reflector sheet and the light guide plate. The refraction index of the medium layer is smaller than or equal to 1.12. By providing the air layer and the reflector sheet, light beam emitting out of a side of the light guide plate and going back to the light guide plate can meet conditions of total reflection, so as to prevent from generating a light leakage phenomenon at edges of the light guide plate.

11 Claims, 6 Drawing Sheets

SIDE-LIGHT TYPE LIGHT GUIDE PLATE ASSEMBLY AND BACKLIGHT MODULE

FIELD OF THE INVENTION

The present invention relates to a side-light type light guide plate (LGP) assembly and backlight module, and more particularly to a side-light type LGP assembly and backlight module capable of preventing from generating a light leakage phenomenon at edges of the LGP.

BACKGROUND OF THE INVENTION

A liquid crystal display (LCD) is a type of flat panel display (FPD), which shows images by the property of liquid crystal material. Comparing with other display devices, the liquid crystal display has advantages in lightweight, compactness, low driving voltage and low power consumption, and thus has already become the mainstream product in the whole consumer market. However, the liquid crystal material of the liquid crystal display cannot emit light by itself, and thus the liquid crystal display further has a backlight module which functions to provide a light with evenly brightness distribution. The backlight module mainly comprises a backlight source, a lampshade, a reflector sheet, a light guide plate (LGP), a diffusion sheet, a brightness enhancement film, an outer frame, and so on.

Generally, the backlight module can be divided into two types, i.e. the side-light type backlight module and the direct-light type backlight module, wherein the direct-light type backlight module does not include a LGP, but reflects the light upward by a lower reflector sheet and outputs it through an upper diffusion sheet. On the other hand, the side-light type backlight module includes a LGP, wherein the light is emitted into the LGP from a side surface thereof, then is reflected due to the specific reflection function of the LGP, and finally is outputted upward from its top surface.

Referring now to FIGS. 1 and 2, a side view of a traditional side-light type backlight module is illustrated in FIG. 1, and a partially enlarged view of a reflector sheet on one side of a LGP of FIG. 1 is illustrated in FIG. 2. As shown in FIG. 1, a traditional backlight module comprises a LGP 10, a light source assembly 20 and a plurality of reflector sheets 30, wherein the LGP 10 and the reflector sheets 30 are also called a LGP assembly. The LGP 10 comprises a lower surface 10a, a light input side surface 11 and a light output surface 12, wherein the lower surface 10a is opposite to the light output surface 12, and the light input side surface 11 is connected between the light output surface 12 and the lower surface 10a. The light source assembly 20 comprises a light source 21 and a lampshade 22. The light source assembly 20 is adjacent to the light input side surface 11 of the LGP 10, and the light source assembly 20 is used to provide a light to emit into the light input side surface 11 of the LGP 10. The reflector sheets 30 are disposed on other side surfaces of the LGP 10, except for the light input side surface 11. (As shown in FIG. 1, a reflector sheet 30 is disposed on a side surface of the LGP 10 opposite to the light input side surface 11.)

As shown in FIG. 1, a light beam is exemplified, wherein the light beam is reflected between the lower surface 10a and the light output surface 12 in the LGP 10, and finally reflected to a side surface the LGP 10 opposite to the light input side surface 11. If meeting conditions of total reflection, the light beam will directly go back into the LGP 10; and if not meeting the conditions of total reflection, the light beam will emit out of the LGP 10 and reflect to the reflector sheet 30. Then, the light beam will be reflected from the reflector sheet 30 and go back into the LGP 10.

Furthermore, referring to FIGS. 1 and 2, for outputting the light beam from the light output surface 12, the lower surface 10a of the LGP 10 further has dots 13 (or microstructures) to destroy the phenomenon of total reflection during outputting the light beam from the light output surface 12, wherein the light beam can carry out the diffuse reflection due to the dots 13. Thus, the light beam after the diffuse reflection does not meet the conditions of total reflection of the light output surface 12 and thus can be outputted upward from the light output surface 12 for being used as a backlight source of a liquid crystal display. A lower reflector sheet 14 is further disposed below the LGP 10, in order to guide other light beam which emits downward due to the diffuse reflection back into the LGP 10 for increasing the light utilization efficiency.

However, there is still a technical problem existing in the traditional side-light type backlight module. As shown in FIG. 2, the reflector sheet 30 is attached to the side surface of the LGP 10 by a transparent adhesive layer 31. Because the refractive index of the LGP 10 and the transparent adhesive layer 31 is equal to about 1.5. Thus, when the light beam passing through the LGP 10 and the transparent adhesive layer 31 is reflected by the reflector sheet 30, it will cause a phenomenon of diffuse reflection (due to imperfect smooth surface). As a result, a portion of light beam goes back into the LGP 10 and emit to the light output surface 12, wherein the portion of light beam can not meet the conditions of total reflection (the incident angle smaller than 42 degree) and thus directly emit out of the light output surface 12. Because the portion of light beam is not dispersed by the dots 13 (or microstructures) on the lower surface 10a, the portion of light beam is relatively bright and will cause a light leakage phenomenon at edge neighboring regions of the LGP 10, so as to affect the total display effect.

In the traditional technology, to solve the foregoing problem, the width of an outer frame of a display may be further increased. The outer frame 40 as shown by imaginary lines in FIG. 2 has a width, wherein the width of the outer frame 40 is designed to shade a maximum region of the LGP 10 where may generate the light leakage (L). However, this solution can not essentially solve the generation of the light leakage phenomenon. Thus, for satisfying needs of efficient visual angle of liquid crystal displays, the LGP 10 must add its area (i.e. add material), resulting in lowering the light utilization efficiency. Moreover, the profile of the display must be widened, but it will be disadvantageous to carry out the design of narrow frame edges.

As a result, it is necessary to provide a side-light type LGP assembly and backlight module to solve the problems existing in the conventional technologies, as described above.

SUMMARY OF THE INVENTION

A primary object of the present invention is to provide a side-light type light guide plate assembly and backlight module, which at least can prevent from generating a light leakage phenomenon at edges of a light guide plate.

To achieve the above object, the present invention provides a side-light type backlight module which comprises:

a light guide plate (LGP) having a lower surface, a light output surface opposite to the lower surface, and at least one light input side surface connected between the lower surface and the light output surface;

at least one reflector sheet correspondingly disposed on at least one side surface of the LGP except for the light input side surface, wherein an air layer is defined between the reflector sheet and the LGP;

a light source disposed on one side of the light input side surface and used to provide light which emits into the LGP from the light input side surface; and an outer frame covered around the LGP, wherein the reflector sheet is mounted in an inner side surface of the outer frame.

In one embodiment of the present invention, a side of the reflector sheet facing the LGP is mounted with an optical film; a side of the optical film facing the LGP is concave and convex; the optical film is attached to the LGP by a transparent adhesive layer; and the air layer is defined between the optical film and the transparent adhesive layer.

In one embodiment of the present invention, the optical film is attached to the reflector sheet by another transparent adhesive layer.

To achieve the above object, the present invention provides another side-light type backlight module which comprises:

a light guide plate (LGP) having a lower surface, a light output surface opposite to the lower surface, and at least one light input side surface connected between the lower surface and the light output surface;

at least one reflector sheet correspondingly disposed on at least one side surface of the LGP except for the light input side surface, wherein a medium layer is defined between the reflector sheet and the LGP, and the refraction index of the medium layer is smaller than or equal to 1.12; and a light source disposed on one side of the light input side surface and used to provide light which emits into the LGP from the light input side surface.

In one embodiment of the present invention, the medium layer is an air layer.

In one embodiment of the present invention, further comprising: an outer frame covered around the LGP, wherein the reflector sheet is mounted in an inner side surface of the outer frame.

In one embodiment of the present invention, the thickness of the air layer is between 0.05 mm to 2 mm.

In one embodiment of the present invention, further comprising: a plurality of spacers disposed between the reflector sheet and the LGP to keep the thickness of the air layer.

In one embodiment of the present invention, the reflector sheet is mounted on the LGP by engagement connection or screw connection.

In one embodiment of the present invention, a side of the reflector sheet facing the LGP is mounted with an optical film; a side of the optical film facing the LGP is concave and convex; the optical film is attached to the LGP by a transparent adhesive layer; and the air layer is defined between the optical film and the transparent adhesive layer.

In one embodiment of the present invention, the optical film is attached to the reflector sheet by another transparent adhesive layer.

To achieve the above object, the present invention provides a side-light type light guide plate (LGP) assembly which comprises:

a LGP having a lower surface, a light output surface opposite to the lower surface, and at least one light input side surface connected between the lower surface and the light output surface; and at least one reflector sheet correspondingly disposed on at least one side surface of the LGP except for the light input side surface, wherein a medium layer is defined between the reflector sheet and the LGP, and the refraction index of the medium layer is smaller than or equal to 1.12.

In one embodiment of the present invention, the medium layer is an air layer.

In one embodiment of the present invention, the thickness of the air layer is between 0.05 mm to 2 mm.

In one embodiment of the present invention, further comprising: a plurality of spacers disposed between the reflector sheet and the LGP to keep the thickness of the air layer.

In one embodiment of the present invention, the reflector sheet is mounted on the LGP by engagement connection or screw connection.

In one embodiment of the present invention, a side of the reflector sheet facing the LGP is mounted with an optical film; a side of the optical film facing the LGP is concave and convex; the optical film is attached to the LGP by a transparent adhesive layer; and the air layer is defined between the optical film and the transparent adhesive layer.

In one embodiment of the present invention, the optical film is attached to the reflector sheet by another transparent adhesive layer.

In comparison with the traditional technology, the present invention is provided with a medium layer having a refraction index smaller than or equal to 1.12 between the LGP and the reflector sheet, such that the light going back into the LGP from the medium layer and emitting to the light output surface can meet the conditions of total reflection. Thus, the light will not directly emit out of the light output surface, but will be reflected by the light output surface to the lower surface of the LGP, and then be diffused by the dots of the lower surface, followed by emitting out of the light output surface. As a result, the present invention can prevent from generating a light leakage phenomenon due to directly emitting out of the light output surface.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 1:
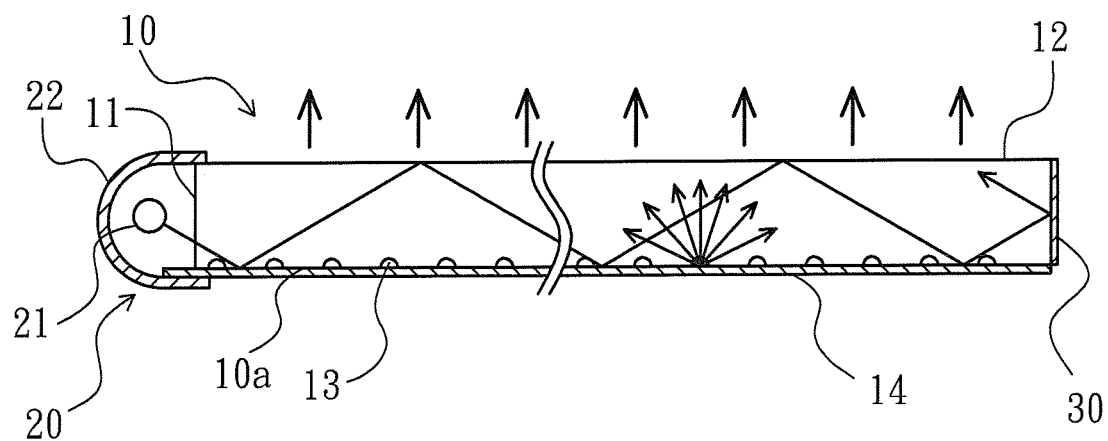
FIG. 1 is a side view of a traditional side-light type backlight module.
Figure 2:
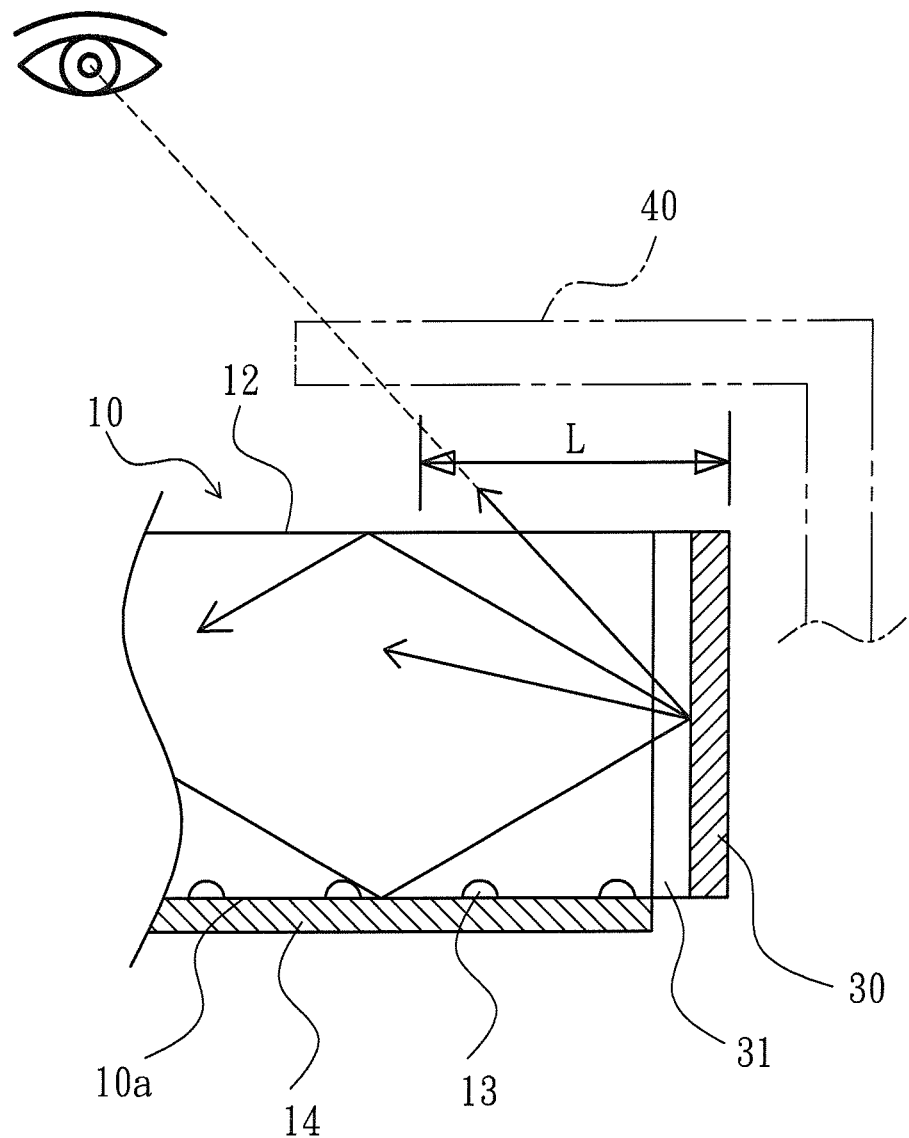
FIG. 2 is a partially enlarged view of FIG. 1.
Figure 3A:
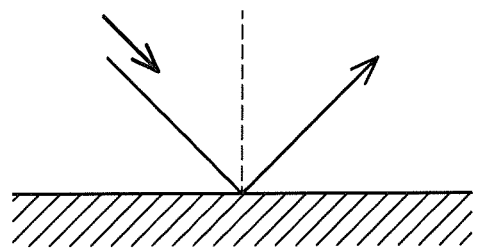
FIGS. 3A to 3C are schematic views of light reflection phenomenon.
Figure 3B:
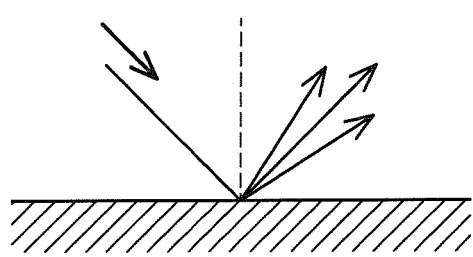
Figure 3C:
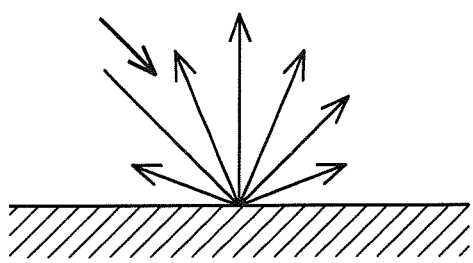

The light emitting phenomenon is described, as follows:

(1) Reflection: the reflection can be divided into three types: specular reflection, spread reflection and diffuse reflection. As shown in FIG. 3A, the specular reflection means that the incident angle of a light is equal to the reflective angle thereof in relation to a perfectly smooth surface. As shown in FIG. 3B, the spread reflection occurs on a normal planar surface, wherein the reflective light is reflected greater than a predetermined angle, and the reflective angle of all reflective light is substantially equal to the incident angle thereof. As shown in FIG. 3C, the diffuse reflection occurs on a rough or unsmooth surface, wherein the reflective light has various different reflective angles.

Figure 4:
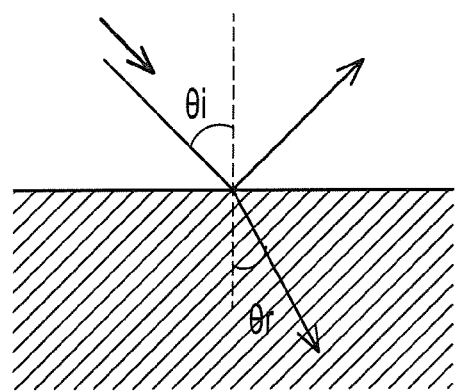
FIG. 4 is a schematic view of light refraction phenomenon.

(2) Refraction: As shown in FIG. 4, when a light emits from one type of material into another type of material (such as from the air into an transparent glass), the light will be refracted, i.e. the light will change its speed and direction. The refraction is determined based on two factors: one factor is an incident angle ($\theta i$), and the other is the refractive index (N) of material. The refractive index is equal to the speed of light in vacuum (C) divided by the speed of light in the material (V): N=C/V. The speed of light in the air is almost equal to the speed of light in vacuum, so that the refractive index in the air can be considered as 1 (N=1.000293). The refractive index of all other matters is almost greater than 1, because the speed of light will be lowered down when passing through one of the matters. When the light passes through another medium having a different refractive index, the relationship between the incident angle ($\theta i$) and the refractive angle ($\theta r$) can be represented by the Snell's Law.

For example, if a light emits from the air (refractive index=1) into a LGP (refractive index=1.5), a portion of the light will be reflected, and the other portion of the light will pass through the LOP. If there is an included angle between the incident light and a normal line, the light will generate the phenomenon of refraction, wherein the incident angle will be greater than the refractive angle according to the Snell's Law (n1 sin $\theta 1$=n2 sin $\theta 2$). If the light emits from the LGP into the air, a portion of the light will be reflected, and the other portion of the light will be refracted, wherein the incident angle will be smaller than the refractive angle. When the refractive angle is up to 90 degree (i.e. the refractive light is vertical to the normal line and parallel to the interface), the incident angle is called a critical angle. When the light emits from the LGP to the air, the critical incident angle is about 42 degree. It means that when the incident angle is equal to or greater than about 42 degree, the light will not emit out of the LGP and all of the light will be reflected back into the LGP, i.e. the total reflection principle applied by the LOP.

Furthermore, according to the foregoing examples, a comparison table of the refractive angle of the light between the air and the LGP can be provided, wherein the emitting direction of light is reversible. In other words, when light refracts, the angle that the light emits from the air into the LGP is equal to the angle that the light emits from the LGP into the air, and only the direction thereof is reverse.

TABLE 1

| the comparison table of the refractive angle of the light between the air and the LGP | |
|---|---|
| the refractive angle in the air (N = 1) | the refractive angle in the LGP (N = 1.5) |
| 0° | 0° |
| 10° | 6.7° |
| 20° | 13.2° |
| 30° | 19.6° |
| 40° | 25.5° |
| 50° | 30.9° |
| 60° | 35.5° |
| 70° | 39° |
| 80° | 41.3° |
| 90° | 42° |

Figure 5:
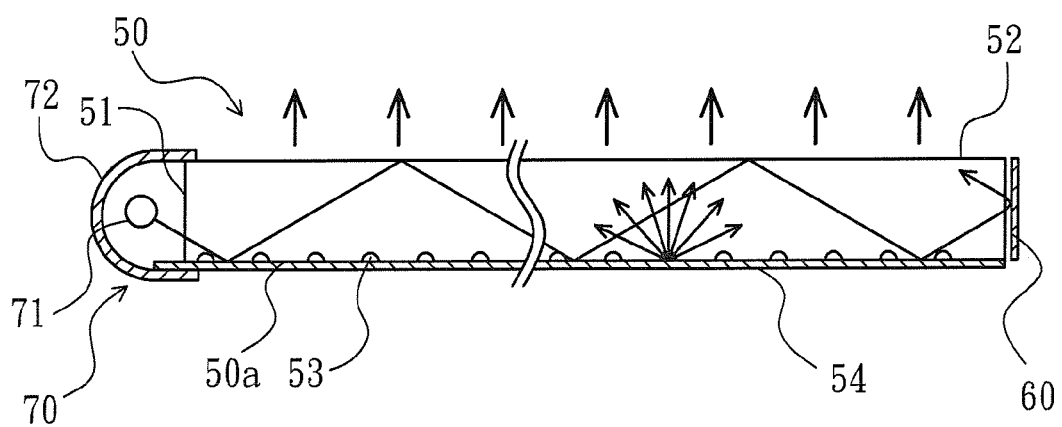
FIG. 5 is a side view of a side-light type backlight module according to one embodiment of the present invention.
Figure 6:
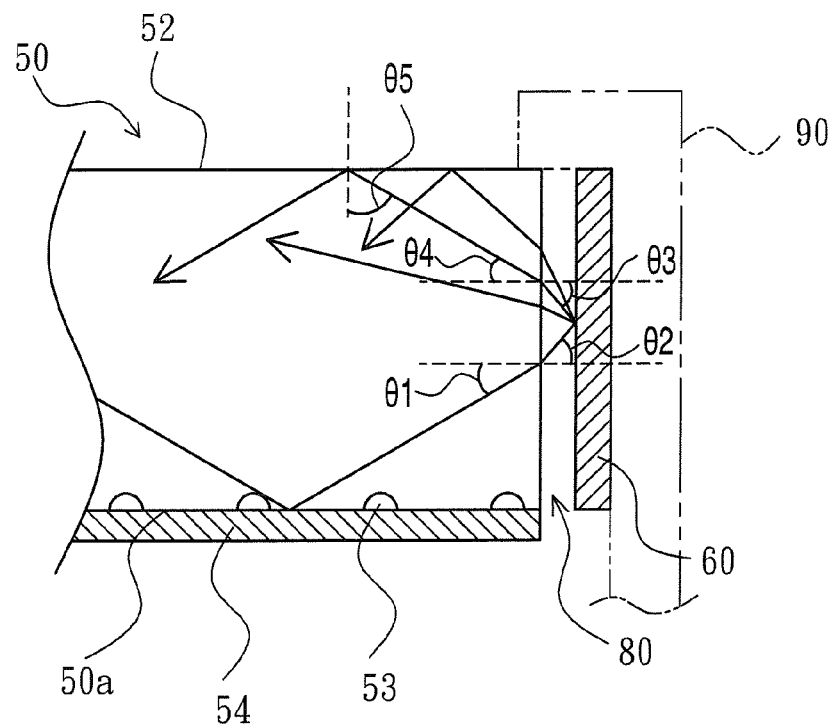
FIG. 6 is a partially enlarged view of FIG. 5.

Referring now to FIGS. 5 and 6, a side view of a side-light type backlight module according to one embodiment of the present invention is illustrated in FIG. 5, and a partially enlarged view of FIG. 5 is illustrated in FIG. 6. As shown in FIGS. 5 and 6, the side-light type backlight module of the embodiment comprises a light guide plate (LGP) 50 and a plurality of reflector sheets 60, wherein the LGP 50 and the reflector sheets 60 are also called a LGP assembly. The LGP 50 comprises a lower surface 50a, a light input side surface 51 and a light output surface 52, wherein the lower surface 50a is opposite to the light output surface 52, and the light input side surface 51 is connected between the light output surface 52 and the lower surface 50a. The reflector sheet 60 is correspondingly disposed on a side surface of the LGP 50 except for the light input side surface 51, while a medium layer is defined between the reflector sheet 60 and the LGP 50. In the embodiment, the medium layer is an air layer 80.

It should be noted that FIGS. 5 and 6 are side views and only show one reflector sheet 60 disposed on the side of the LGP 50 opposite to the light input side surface 51 for exemplification. In fact, for preventing the light from being leaked from other sides of the LGP 50, the reflector sheet 60 also can be disposed on all of these other sides of the LGP 50 except for the light input side surface 51.

As shown in FIG. 5, the backlight module further comprises a light source assembly 70 which has a light source 71 and a lampshade 72. The light source assembly 70 is disposed on a side of the light input side surface 51 of the LGP 50. The light source 71 is used to provide light which can emit into the LGP 50 through the light input side surface 51 of the LGP 50, while the lampshade 72 is hemi-spherical for covering the light source 71 to prevent the light from being leaked outward and to guide the light back into the LGP 50.

Moreover, as shown in FIG. 5, for emitting the light out of the light output surface 52, the lower surface of the LGP 50 is provided with a plurality of dots 53 (or microstructures) to destroy the total reflection phenomenon and to carry out the diffuse reflection of the light. Thus, some light which does not meet the conditions of total reflection can be emitted upward from the light output surface 52, so as to provide a backlight source of the liquid crystal display. In addition, a lower reflector sheet 54 is disposed below the LGP 50, in order to guide other light beam which emits downward due to the diffuse reflection back into the LGP 50 for increasing the light utilization efficiency.

As shown in FIG. 6, a light beam is exemplified, wherein the light beam is reflected between the lower surface 50a and the light output surface 52 in the LGP 50, and finally reflected to a side surface of the LGP 50 opposite to the light input side surface 51. If meeting conditions of total reflection, the light beam will directly go back into the light guide plate 50; and if not meeting the conditions of total reflection, the light beam will emit out of the LGP 50. When the light beam enters the air layer 80, there will be a refraction phenomenon (referring to the Snell's Law: n1 sin θ1=n2 sin θ2 or the foregoing comparison table of the refractive angle of the light between the air and the LGP, the refractive angle θ2 is greater than the incident angle θ1) and the light beam emits to the reflector sheet 60. Then, the light beam is reflected back to the air layer 80, and emits to a critical surface between the air layer 80 and the LGP 50 (about along the direction θ3).

When the light beam going back from the reflector sheet 60 due to diffuse reflection passes through the air layer 80 and emits to the LGP 50, there will be two possible conditions: the light beam meeting the condition of reflection will be reflected back into the air layer 80 from the LGP 50; the light beam meeting the condition of refraction will be refracted into the LGP 50 (the refractive angle θ4 is smaller than the incident angle θ3). Because the refractive angle θ4 of the light going back the LGP 50 is certainly smaller than 42 degree (angle of total reflection). Therefore, the light going back to the LGP 50 will emit to the light output surface 52 according to an incident angle θ5 (i.e. a complementary angle of θ4) which is certainly greater than 48 degree (90 degree minus 42 degree), so as to meet the conditions of total reflection.

Thus, the air layer 80 can cause that the light beam going back to the LGP 50 from the air layer 80 has a refractive angle smaller than the angle of total reflection and thus the light beam going back to the LGP 50 will emit to the light output surface 52 according to an incident angle greater than the angle of total reflection, so as to meet the conditions of total reflection. As a result, it can guarantee that the light beam going back to the LGP 50 will not directly emit out of the light output surface 52, but will be reflected by the light output surface 52 and emit to the lower surface 50a of the LGP 50. After being further diffused by the dots 53 of the lower surface 50a, the light beam will be emit out of the light output surface 52. Thus, it can prevent the light beam going back to the LGP 50 from the reflector sheet 60 from directly emitting out of the light output surface 52 to generate a light leakage phenomenon.

In the present invention, the thickness of the air layer 80 (i.e. the distance between the LGP 50 and the reflector sheet 60) is preferably between 0.05 mm to 2 mm.

The side-light type LGP assembly of the present invention has the air layer 80 disposed between the LGP 50 and the reflector sheet 60, so that the light emitting out of the side of the LGP 50 and going back to the LGP 50 can meet the condition of total reflection when further emitting to the light output surface 52, so as to prevent from generating a light leakage phenomenon at edges of the LGP 50. As a result, it is unnecessary to add the width of an outer frame of a display to shade the light leakage, so that the light utilization efficiency can be relatively increased (and the material of the LGP 50 can be saved), while it is advantageous to narrow the design of the outer frame of the display.

Furthermore, material of the reflector sheet 60 can be PET (polyethylene terephthalate), PP (polypropylene), PE (polyethylene), PC (polycarbonate) and etc., or directly formed by applying a reflective paint. Moreover, the reflector sheet 60 disclosed by the present invention is disposed on edges of the LGP 50 and keeps a predetermined distance therebetween. However, the mounting means of the reflector sheet 60 of the present invention is not limited. For example, the reflector sheet 60 can be mounted on the LGP 50 by engagement connection or screw connection. In addition, the reflector sheet 60 can be mounted on an external component by adhesive, engagement connection or screw connection, especially mounted on other component of the backlight module, such as an outer frame 90 covered around the LGP 50 as shown by imaginary line in FIG. 6 (which may be a portion of a back plate or a front frame of the backlight module), wherein the reflector sheet 60 can be mounted on an inner side of the outer frame 90 by adhesive, engagement connection or screw connection.

Figure 7:
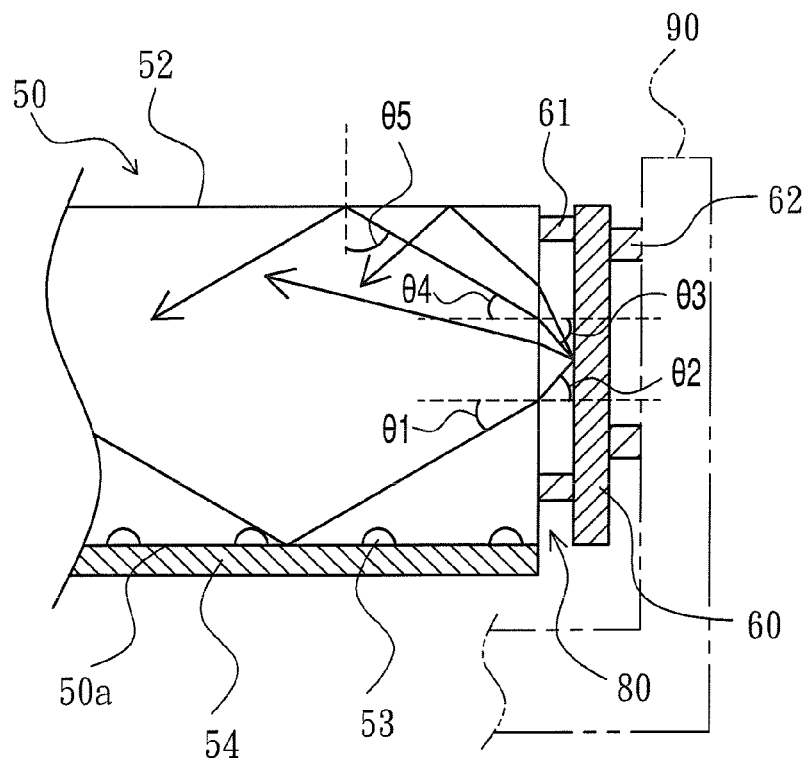
FIG. 7 is a side view of a side-light type backlight module according to another embodiment of the present invention.

Referring now to FIG. 7, a side-light type backlight module according to another embodiment of the present invention is illustrated in FIG. 7. The side-light type LGP assembly of the embodiment is similar to the side-light type LGP assembly in the embodiment as shown in FIG. 5, so as to use similar terms or numerals of the foregoing embodiment. As shown, the difference of this embodiment is that a plurality of spacers 61 are disposed between the reflector sheet 60 and the LGP 50 to keep the thickness of the air layer 80. On the other hand, a plurality of spacers 62 are disposed between the reflector sheet 60 and the outer frame 90 to keep the distance between the reflector sheet 60 and the outer frame 90.

Figure 8:
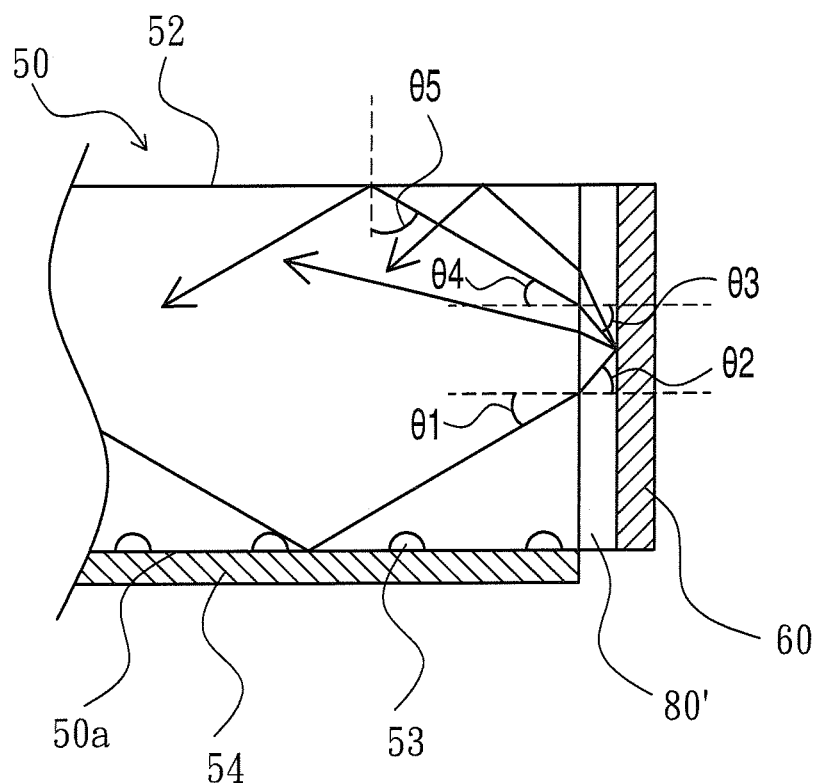
FIG. 8 is a side view of a side-light type backlight module according to still another embodiment of the present invention.

Referring now to FIG. 8, a side-light type backlight module according to still another embodiment of the present invention is illustrated in FIG. 8. The side-light type LGP assembly of the embodiment is similar to the side-light type LGP assembly in the embodiment as shown in FIG. 5, so as to use similar terms or numerals of the foregoing embodiment. As shown, the difference of this embodiment is that a medium layer between the LGP 50 and the reflector sheet 60 is not the air layer 80, but is a solid medium layer 80'. The thickness of the medium layer 80' is preferably between 0.05 mm to 2 mm, while the refraction index of the medium layer 80' is smaller than or equal to 1.12. It is confirmed that the light beam going back to the LGP 50 from the medium layer 80' has a refraction angle smaller than the angle of total reflection, so that the light beam going back to the LGP 50 can emit to the light output surface 52 according to an incident angle greater than the angle of total reflection for meeting the condition of total reflection. As a result, it can guarantee that the light beam going back to the LGP 50 will not directly emit out of the light output surface 52, but will be reflected by the light output surface 52 and emit to the lower surface 50a of the LGP 50. After being further diffused by the dots 53 of the lower surface 50a, the light beam will be emit out of the light output surface 52. Thus, it can prevent from generating a light leakage phenomenon if the light beam going back to the LGP 50 from the reflector sheet 60 directly emits out of the light output surface 52.

Figure 9:
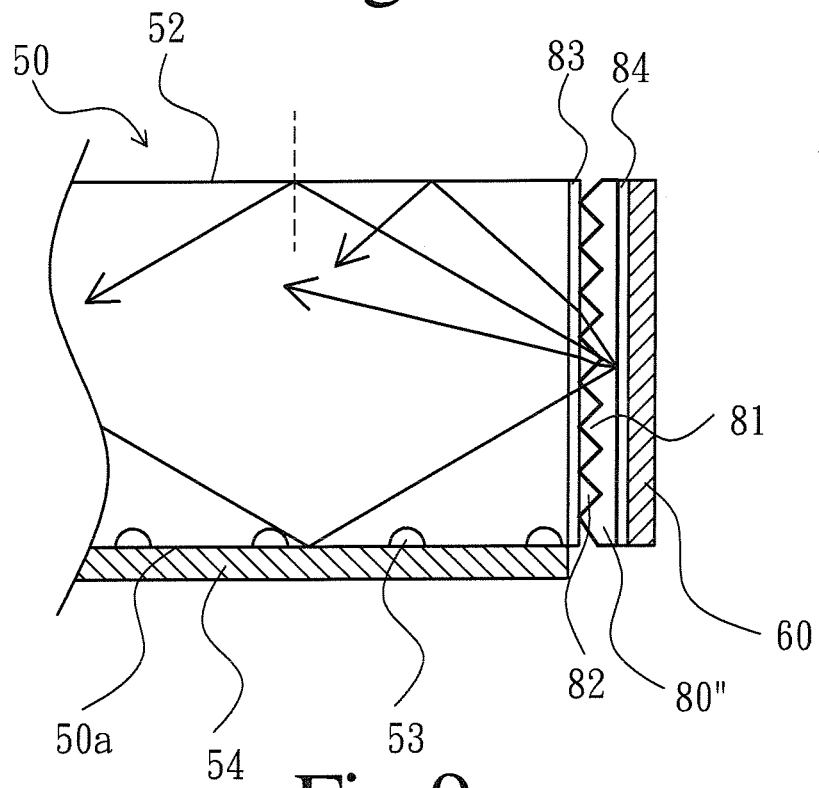
FIG. 9 is a side view of a side-light type backlight module according to still further another embodiment of the present invention.

Referring now to FIG. 9, a side-light type backlight module according to still further another embodiment of the present invention is illustrated in FIG. 9. The side-light type LGP assembly of the embodiment is similar to the side-light type LGP assembly in the embodiment as shown in FIG. 5, so as to use similar terms or numerals of the foregoing embodiment. As shown, the difference of this embodiment is that a side of the reflector sheet 60 facing the LGP 50 is mounted with an optical film 80"; a side of the optical film 80" facing the LGP 50 is concave and convex; the concave and convex side of the optical film 80" is attached to the LGP 50 by a transparent adhesive layer 83; the optical film 80" is attached to the reflector sheet 60 by another transparent adhesive layer 84; and an air layer 82 is defined between the optical film 80" and the transparent adhesive layer 83. In other words, the air layer 82 is a gap defined between the concave and convex side of the optical film 80" and the transparent adhesive layer 83.

As shown in FIG. 9, the side-light type LGP assembly of the embodiment has an air layer 82 defined between the optical film 80" and the transparent adhesive layer 83, wherein the air layer 82 can reduce the degree of the light leakage phenomenon generated at edges of a LGP 50. Meanwhile, the optical film 80" has a high transmittance to reduce the lost of light. Furthermore, the optical film 80" is attached to the LGP 50 by the transparent adhesive layer 83, so that it can further overcome the influence of thermal expansion and shrinkage of the LGP 50 for simplifying the installation. In addition, the optical film 80" can be a prism sheet, a diffusion film or other optical films, but the present invention is not limited thereto.

As described above, in comparison with the traditional technology that the reflector sheet disposed on one side of the side-light type LGP by the transparent adhesive layer and will cause a light leakage phenomenon at edge neighboring regions of the LGP to affect the total display effect, the side-light type LGP assembly and backlight module of the present invention is provided with the medium layer having a refractive index smaller than or equal to 1.12 and disposed between the LGP and the reflector sheet, so that the light beam emitting out of the side of the LGP and going back to the LGP can meet the condition of total reflection when emitting to the light output surface for thus reducing the light leakage phenomenon at edges of a light guide plate. As a result, it is unnecessary to add the width of an outer frame of a display to shade the light leakage, so that the light utilization efficiency can be relatively increased (and the material of the LGP 50 can be saved), while it is advantageous to narrow the design of the outer frame of the display.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A side-light type backlight module, wherein the side-light type backlight module comprises:
   a light guide plate (LGP) having a lower surface, a light output surface opposite to the lower surface, and at least one light input side surface connected between the lower surface and the light output surface;
   at least one reflector sheet correspondingly disposed on at least one side surface of the LGP except for the light input side surface, wherein an air layer is defined between the reflector sheet and the LGP;
   a light source disposed on one side of the light input side surface and used to provide light which emits into the LGP from the light input side surface; and
   an outer frame covered around the LGP, wherein the reflector sheet is mounted in an inner side surface of the outer frame;
   wherein a side of the reflector sheet facing the LGP is mounted with an optical film; a side of the optical film facing the LGP is concave and convex; the optical film is attached to the LGP by a transparent adhesive layer; and the air layer is defined between the optical film and the transparent adhesive layer.

2. The side-light type backlight module according to claim 1, wherein the optical film is attached to the reflector sheet by another transparent adhesive layer.

3. A side-light type backlight module, wherein the side-light type backlight module comprises:
   a light guide plate (LGP) having a lower surface, a light output surface opposite to the lower surface, and at least one light input side surface connected between the lower surface and the light output surface;
   at least one reflector sheet correspondingly disposed on at least one side surface of the LGP except for the light input side surface, wherein a medium layer is defined between the reflector sheet and the LGP, and the refraction index of the medium layer is smaller than or equal to 1.12; and
   a light source disposed on one side of the light input side surface and used to provide light which emits into the LGP from the light input side surface;
   wherein the medium layer is an air layer; a side of the reflector sheet facing the LGP is mounted with an optical film; a side of the optical film facing the LGP is concave and convex; the optical film is attached to the LGP by a transparent adhesive layer; and the air layer is defined between the optical film and the transparent adhesive layer.

4. The side-light type backlight module according to claim 3, further comprising: an outer frame covered around the LGP, wherein the reflector sheet is mounted in an inner side surface of the outer frame.

5. The side-light type backlight module according to claim 3, wherein a thickness of the air layer is between 0.05 mm to 2 mm.

6. The side-light type backlight module according to claim 3, further comprising: a plurality of spacers disposed between the reflector sheet and the LGP to keep a thickness of the air layer.

7. The side-light type backlight module according to claim 3, wherein the optical film is attached to the reflector sheet by another transparent adhesive layer.

8. A side-light type light guide plate (LGP) assembly, wherein the side-light type LGP assembly comprises:
   a LGP having a lower surface, a light output surface opposite to the lower surface, and at least one light input side surface connected between the lower surface and the light output surface; and
   at least one reflector sheet correspondingly disposed on at least one side surface of the LGP except for the light input side surface, wherein a medium layer is defined between the reflector sheet and the LGP, and the refraction index of the medium layer is smaller than or equal to 1.12;
   wherein the medium layer is an air layer; a side of the reflector sheet facing the LGP is mounted with an optical film; a side of the optical film facing the LGP is concave and convex; the optical film is attached to the LGP by a transparent adhesive layer; and the air layer is defined between the optical film and the transparent adhesive layer.

9. The side-light type LGP assembly according to claim 8, wherein a thickness of the air layer is between 0.05 mm to 2 mm.

10. The side-light type LGP assembly according to claim 8, further comprising: a plurality of spacers disposed between the reflector sheet and the LGP to keep a thickness of the air layer.

11. The side-light type LGP assembly according to claim 8, wherein the optical film is attached to the reflector sheet by another transparent adhesive layer.

* * * * *